May 4, 1965 G. W. MAHLMAN 3,182,198

SEMI-CONDUCTOR INFRARED RADIATION DETECTING AND CONVERTING APPARATUS

Filed March 12, 1962

GEORGE W. MAHLMAN,
INVENTOR
BY
W[illegible]
ATTORNEY.

United States Patent Office 3,182,198

Patented May 4, 1965

3,182,198

SEMI-CONDUCTOR INFRARED RADIATION DETECTING AND CONVERTING APPARATUS

George W. Mahlman, Woodland Hills, Calif., assignor to Hughes Aircraft Company, Culver City, Calif., a corporation of Delaware Filed Mar. 12, 1962, Ser. No. 178,850
6 Claims. (Cl. 250—211)

Figures 1, 2:
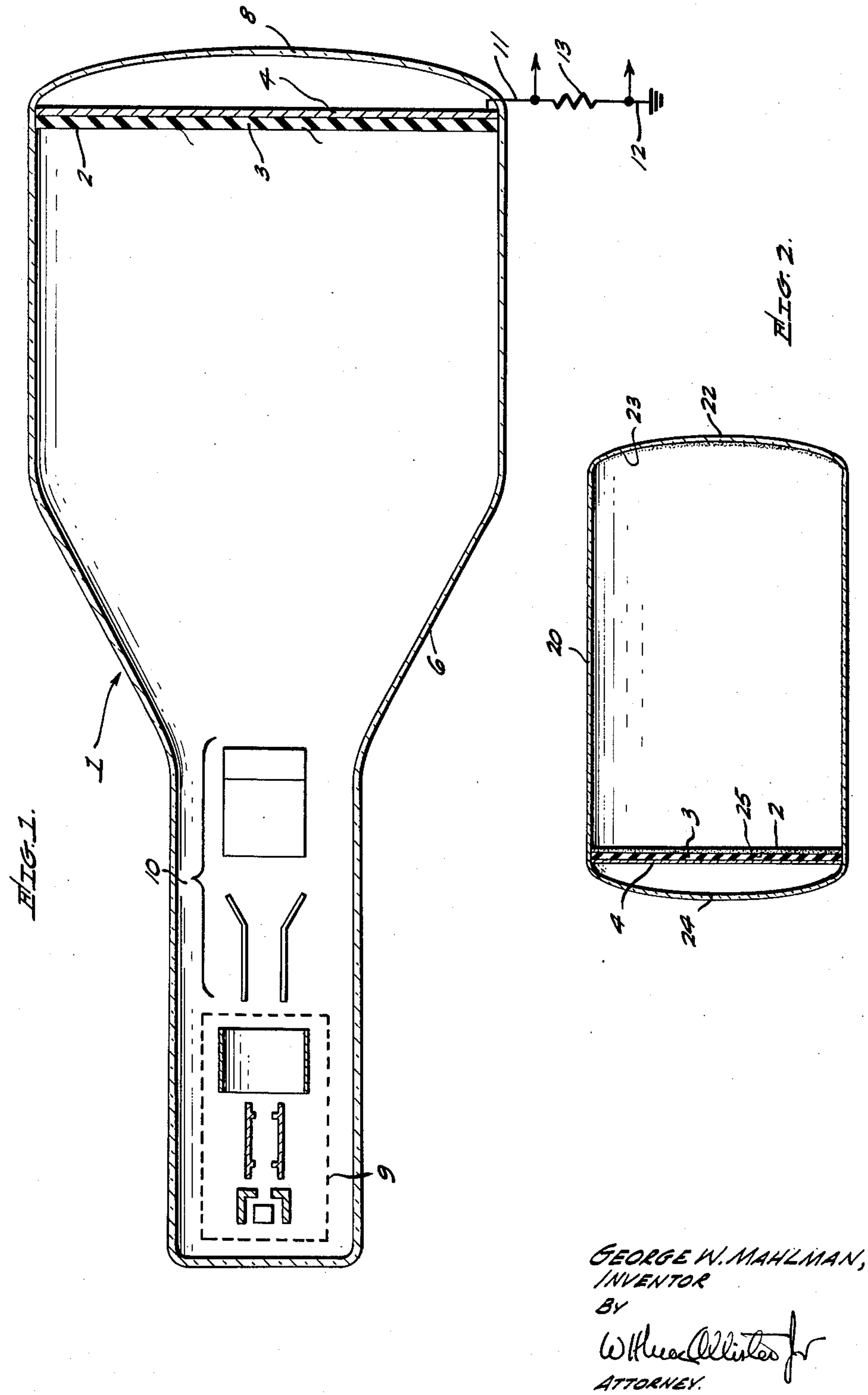

This invention relates to photoconduction in solid state materials and devices. More particularly the invention relates to devices having means for converting relatively long wavelengths of invisible energy into either useful electrical energy and signals or into visible energy capable of being displayed and viewed.

The phenomenon of detecting radiation of long wavelengths (i.e., infrared) by using photoconduction in a solid material is well-known. In general such photoconductors have been of two principal types: photoconductors of intrinsic or substantially pure materials and photoconductors of doped or intentionally impure materials. Semiconductor materials such as germanium have been investigated primarily for this purpose. However, such photoeffects are not necessarily limited to semiconductors; certain other insulator materials have also been investigated. See for example, the paper by M. A. Gilleo in the Physical Review for August 1, 1953 (Physical Review, vol. 91–3, p. 534), where the photoemission from silver into silver chloride, potassium bromide and sodium chloride is discussed.

While intrinsic photoconductors have been developed that operate satisfactorily at wavelengths for as long as 6 to 8 microns, no satisfactory intrinsic photoconductors are available for operating at the longer wavelengths, particularly the wave lengths comprising the so-called "thermal window" of the atmosphere (the 8 to 14 micron region). This is primarily because the requisite energy gap, which is 0.09 ev., can not be obtained in intrinsic materials. The requisite energy gap expressed in ev., is determined by the wavelength to be detected according to the following formula: $E_G=1.24/\text{wavelengths in microns}$. Thus the following materials cut off at the following wavelengths in accordance with their respective energy gap: silicon at 1.2 microns, germanium at 1.8 microns, lead sulphide at 3 microns, lead telluride at 6 microns, lead selenide at 7 microns, and indium antimonide at 8 microns.

Impurity semiconductors that function beyond wavelengths of 8 microns have also been produced. However, these doped conductors have many shortcomings. For one thing a very high doping level for impurity concentration is required in order to obtain or provide an absorption coefficient of sufficient magnitude for the incident infrared radiation. The high doping level required to provide a satisfactory absorption coefficient results in an increase of the "dark" free carriers in the photoconductor. In addition the energy levels are spread out and eventually overlap the conduction or valence band, and carriers are produced which cannot be "frozen out" no matter how low the temperature. High impurity concentrations also decrease the distance a free carrier can move before recombination. In addition the characteristic low absorption coefficient of the impurity semiconductor has necessitated the use of a relatively thick (about 2 mm.) element to absorb a reasonable fraction of the incident radiation. Such a large physical requirement also results in there being more noise.

According to the present invention a solid state photoconductor is provided which is capable of detecting energy or wavelengths up to 14 microns or longer, while having a very high "dark" resistivity and being of small physical size, and not requiring high impurity concentrations. These and other advantages of the invention are achieved by providing a photoconductor device comprising a long wave-length radiation absorbing member or cathode in contact with a semiconductor into which charge carriers are emitted by the cathode. Thus the semiconductor portion functions much like that of the gas or vacuum in a photoelectric cell. The photoconductor device of the present invention requires that there be a low potential barrier between the absorber or cathode and the semiconductor and that the mean free path of charge carriers in the absorber must be comparable to or greater than the absorption depth. (The "mean free path" is the distance within which the charge carrier loses most of its excitation energy: the absorption depth is the distance within which most of the incident radiation is absorbed.)

The invention will be described in greater detail with reference to the drawings in which:

FIGURE 1 is a cross-sectional view in elevation of a long wavelength radiation detector utilizing a photoconductor of the present invention for converting long wavelength energy into electrical signals; and FIGURE 2 is a cross-sectional view in elevation of an electron tube employing a photoconductor of the present invention for converting long wavelength energy into optical and visual energy for the display thereof.

With reference to FIGURE 1, an infrared image tube 1 having a photoconductive target 2 according to the invention is provided. The target 2 comprises a semiconductor wafer 3 which may be about 0.002 inch thick and of any desired length and width or radius. The semiconductor wafer 3 may be silicon, for example, of relatively high resistivity which will be explained in greater detail hereinafter. A long wavelength radiation-sensitive absorber layer 4 is bonded to one surface of the semiconductor wafer 3. The absorber layer 4 may be provided by a thin film of gold or other metal deposited on the surface of the semiconductor wafer 3 to a thickness of a few hundred to a few thousand angstroms.

In this embodiment, where the light or long wavelength energy is incident on the outer surface of absorber lay 4, as shown, the thickness of the absorber layer 4 should be about $1/a$ where "$a$" is the absorption coefficient for long wavelength radiation. An absorber of this thickness will absorb and not reflect most of the long wavelength radiation received thereon. The absorption coefficient "$a$," is defined according to the following expression:

$$I=I_0 \exp(-ax)$$

where I is the radiation intensity at a distance, $x$, from the surface, $I_0$ is the radiation intensity at the surface, and "$a$" is the absorption coefficient.

The photons absorbed the absorber or cathode layer 4 produce charge carriers therein. If these excited charge carriers are to be utilized, the thickness of the absorber layer should be less than the mean free path of the excited charge carriers for maximum efficiency. The mean free path is the product of the excited charge carrier velocity and the relaxation time of the absorber, hence the mean free path must be larger than the absorption length, $1/a$, in order that most of the electrons excited by the incident along wavelength radiation may migrate to the semiconductor. To achieve this result, with radiation having a wavelength of the order of 14 microns, an absorber layer about 1000 angstroms thick should be provided according to the present invention.

The interface between the absorber layer and the semiconductor wafer must be substantially as perfect a metal-semiconductor contact as possible. That is, there should be no oxide or other "blocking layers" at this interface; otherwise charge carriers excited in the absorber layer 4 will be unable to pass across the potential barrier between the absorber and the semiconductor. This requirement may also be stated as follows: the work function or potential barrier at the absorber-semiconductor interface must be lower than the energy level of the excited charge carriers. Such a low potential barrier at this interface may be achieved by atomically cleaning the surface of the semiconductor and depositing the absorbing layer there in an ultra-high vacuum. An atomically clean surface may be provided by bombarding the semiconductor surface with argon or by heating the semiconductor in an ultra-high vacuum of $10^{-9}$ mm. of mercury or better.

In addition the achievement of the low potential barrier may also be achieved by utilizing a light doped semiconductor material which is also desirable for other purposes as has been explained. Typical satisfactory resistivities are 1 ohm-centimeter or more. The conductivity type of the semiconductor wafer 2 is preferably N-type or one having an excess of donor impurity over acceptor impurity. Any donor impurity may be used such as arsenic or antimony for example. N-type doping is desired in order to make the potential barrier at the absorber-semiconductor interface small enough to permit long wavelength response which is more difficult to realize with P-type doped materials.

The target 2 in FIGURE 1 is disposed adjacent one end of the tube envelope 6 so that the absorber layer 4 faces the faceplate 8 of the tube 1 so as to be exposed to long wavelength radiation. The faceplate 8 of the tube should be of a material which is transparent to radiation of the wavelengths to be detected. Suitable materials which are transparent to wavelengths in the 8 to 14 micron region are sodium chloride and lithium fluoride, for example.

At the opposite end of the tube 1 an electron beam forming and scanning system is provided. Such apparatus is well-known and does not need extensive detailed description herein. The beam forming and scanning system is of conventional design and operation and includes an electron gun assembly 9 and deflection means 10 whereby an electron beam may be formed and deflected to scan the target 2 in a pre-determined manner.

In operation, a positive potential of about 20 volts is established on the absorber layer 4 by means of the connection 11 to the potential source 12. The semiconductor wafer 3 is then charged to the cathode potential of the eletcron gun 9 by scanning the wafer 3 with the electron beam formed thereby. It is desirable to provide a low energy electron beam whereby the secondary emission ratio of the semiconductor wafer is maintained less than one. Upon exposing the target 2 to long wavelength radiation, charge carriers are injected from the absorber 4 into the semiconductor wafer 3 in accordance with the radiation pattern whereby portions of the wafer 3 become more conductive and hence positively charged in accordance with the amount or intensity of the long wavelength radiation incident on the absorber 4. Upon scanning the semiconductor wafer 3 with the electron beam a second time, the semiconductor wafer 3 is again charged to cathode potential, differently charge portions requiring more or less electrons from the beam depending upon the extent of positive charging due to the intensity of radiation incident on the target 2. In this manner a current flows through the resistor 13 and appears as a signal representing the long wavelength radiation pattern incident on the target. This signal may thus be utilized as a "video" signal for establishing in a conventional cathode ray tube or kinescope a visual display of the radiation received by the image tube.

Referring now to FIGURE 2, a direct-viewing long wavelength image tube 20 embodying the invention is shown. One end or faceplate 22 of the tube is provided with a conventional cathode ray tube phosphor screen 23 excitable to visual luminescence by the impingement of electrons thereon as is well understood in the art. At the other end of the tube a long wavelength radiation sensitive target 2 according to the invention is provided adjacent the faceplate 24 thereof substantially identical with the arrangement shown in FIGURE 1. The target 2 comprises the absorber layer 4 and the semiconductor wafer 3 as before described with the absorber layer facing the long wavelength radiation transparent faceplate 24. Since, in this embodiment, the carriers or electrons injected into the semiconductor wafer 3 are to be emitted from the wafer and caused to impinge upon the phosphor screen 23, the semiconductor wafer 3 should have a thickness less than the mean free path of charge carriers injected into the wafer by the absorber layer 4. In addition, a coating 25 of material capable of lowering the work function at the semiconductor-vacuum interface is provided to facilitate the emission of electrons from the photoconductor wafer 3. Such a coating may be cesium, for example.

In operation, the impingement of long wavelength energy on the absorber layer 4 causes charge carriers to be injected therefrom into the semiconductor wafer 3 from whence they are emitted into the tube vacuum and accelerated by conventional techniques to impinge upon the phosphor screen 23 whereby a visual display corresponding to the pattern of long wavelength energy received is established.

It is not necessary that the absorber layer in the devices of the invention be directly exposed to the incident radiation. Thus the semiconductor element may be so disposed that radiation is incident thereupon and transmitted therethrough to the absorber layer. Such an alternative is based upon the fact that semiconductor materials are transparent to long wavelength energy.

What is claimed is:

1. Apparatus for converting long wavelength energy into electrical signals comprising a long wavelength radiation responsive target having a semiconductor element and a radiation absorber element disposed thereon, the work function at the interface between said semiconductor element and said absorber element being less than the energy level of charge carriers excited in said absorber element, the thickness of said absorber element being less than the mean free path of charge carriers therein, and means for scanning said semiconductor element with an electron beam.

2. A cathode ray pick-up tube for providing electrical output signals in response to long wavelength radiation comprising an envelope, a long wavelength radiation responsive target in said envelope consisting essentially of a semiconductor element having a metallic element in contact therewith adapted to absorb long wavelength energy, the work function of the contact between said semiconductor element and said metallic element being less than the energy level of charge carriers excited in said metallic element, the thickness of said metallic element being less than the mean free path of charge carriers therein, an electron gun for forming an electron beam disposed in said envelope, and means for causing said electron beam to scan said semiconductor element.

3. The invention according to claim 2 wherein said semiconductor element is of N-type conductivity and has a resistivity of at least one ohm-centimeter.

4. Apparatus for directly converting long wavelength energy into visual energy comprising a long wavelength radiation responsive target having a semiconductor element and a radiation absorber element disposed thereon, the work function at the interface between said semiconductor element and said absorber element being less than the energy level of charge carriers excited in said absorber element, the thickness of said semiconductor element and of said absorber element being less than the mean free path of charge carriers therein whereby charge carriers are emitted from said semiconductor element in response to the absorption of long wavelength energy in said absorber element, and luminescent display means responsive to impingement of said emitted charge carriers.

5. A long wavelength energy display device comprising an evacuated envelope, a long wavelength radiation responsive target in said envelope consisting essentially of a semiconductor element having a metallic element in contact therewith adapted to absorb long wavelength energy, the work function of the contact between said semiconductor element and said metallic element being less than the energy level of charge carriers excited in said metallic element, the thickness of said semiconductor element and of said metallic element being less than the mean free path of charge carriers therein, and a luminescent screen disposed in said envelope and adapted to luminescence in response to charge carriers emitted from said semiconductor element.

6. The invention according to claim 5 wherein said semiconductor element is of N-type conductivity and has a resistivity of at least one ohm-centimeter.

References Cited by the Examiner

UNITED STATES PATENTS

| | | | |
|---|---|---|---|
| 2,879,424 | 3/59 | Garbuny et al. | 250—213 X |
| 2,935,711 | 5/60 | Christensen | 250—83.3 |
| 2,938,141 | 5/60 | Garbuny et al. | 250—83 |
| 2,963,390 | 12/60 | Dickson | 250—211 X |
| 2,973,434 | 2/61 | Roberts | 250—83.3 |
| 2,985,783 | 5/61 | Garbuny et al. | 250—83 |
| 3,015,034 | 12/61 | Hanlet | 250—211 |
| 3,049,622 | 8/62 | Ahlstrom et al. | 250—211 |
| 3,051,839 | 8/62 | Carlson et al. | 250—211 |
| 3,054,917 | 9/62 | Eberhardt | 250—83.3 |
| 3,091,693 | 5/63 | Rudomanski et al. | 250—83.3 |
| 3,118,063 | 1/64 | Kaufman | 250—83.3 |
| 3,123,737 | 3/64 | Schneeberger | 250—213 |

RALPH G. NILSON, *Primary Examiner.*

ARCHIE R. BORCHELT, *Examiner.*